(12) United States Patent
Xu et al.

(10) Patent No.: US 11,110,740 B2
(45) Date of Patent: Sep. 7, 2021

(54) COMPOSITE WHEEL

(71) Applicant: CITIC Dicastal CO., LTD, Qinhuangdao (CN)

(72) Inventors: Zuo Xu, Qinhuangdao (CN); Guoyuan Xiong, Qinhuangdao (CN); Wenlin Chen, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 299 days.

(21) Appl. No.: 16/188,433

(22) Filed: Nov. 13, 2018

(65) Prior Publication Data

US 2019/0160861 A1 May 30, 2019

(30) Foreign Application Priority Data

Nov. 30, 2017 (CN) .......................... 201711236060.3

(51) Int. Cl.
| | | |
|---|---|---|
| *B60B 5/02* | (2006.01) | |
| *B60B 3/10* | (2006.01) | |
| *B60B 7/02* | (2006.01) | |
| *B60B 3/02* | (2006.01) | |
| *B60B 1/00* | (2006.01) | |
| *B60B 1/06* | (2006.01) | |

(52) U.S. Cl.
CPC .............. *B60B 5/02* (2013.01); *B60B 3/02* (2013.01); *B60B 3/10* (2013.01); *B60B 7/02* (2013.01); *B60B 1/006* (2013.01); *B60B 1/06* (2013.01); *B60B 2360/104* (2013.01); *B60B 2360/50* (2013.01); *B60B 2900/111* (2013.01); *B60B 2900/513* (2013.01)

(58) Field of Classification Search
CPC .............. B60B 3/001; B60B 3/10; B60B 5/02
See application file for complete search history.

(56) References Cited

U.S. PATENT DOCUMENTS 6,983,901 B2 * 1/2006 Bitton .................... C22B 7/005
241/24.14
2014/0265534 A1 9/2014 Chinavare

FOREIGN PATENT DOCUMENTS

| CN | 103538423 A | * | 1/2014 | ............. B60B 1/003 |
| CN | 205059051 U | | 3/2016 | |
| DE | 102013204845 A1 | | 9/2014 | |
| DE | 102014211174 A1 | | 12/2015 | |
| EP | 1304238 A1 | * | 4/2003 | ............. B60B 1/003 |

\* cited by examiner

*Primary Examiner* — S. Joseph Morano
*Assistant Examiner* — Emily G Castonguay
(74) *Attorney, Agent, or Firm* — Calfee, Halter & Griswold LLP

(57) ABSTRACT

The present application provides a composite wheel, including spokes, a rim and a central disc, one end of each spoke being connected to the central disc and the other end of each spoke being connected to the rim, each spoke includes a spoke skeleton and a spoke shell, and the spoke skeleton is wrapped by the spoke shell; and the spoke shell is made of plastic, rubber, nylon or resin. The technical solution of the present application brings the beneficial technical effects of overcoming the contradiction between the pursuit of the artistic design effect of the wheel and the pursuit of the lightweight of the wheel and meeting the strength requirement of the wheel.

5 Claims, 3 Drawing Sheets

COMPOSITE WHEEL

CROSS-REFERENCE TO RELATED APPLICATIONS

This application claims priority to Chinese Patent Application No. 201711236060.3 filed on Nov. 30, 2017, which is hereby incorporated by reference in its entirety.

TECHNICAL FIELD

The present application relates to a wheel combining an aluminum alloy with a non-metallic material.

BACKGROUND ART

At present, aluminum alloy wheels are widely used with the development of the automotive industry. The aluminum alloy wheels have good load-bearing property and heat dissipation property, and are lighter than steel wheels, thus meet the lightweight requirement of wheels.

However, engineers hope to design more artistic wheels for automobiles with the increasing aesthetic requirements. For example, sometimes the engineers hope to design a wheel with multiple (e.g., 8-12) spokes, or a wheel with wider spokes. In this case, the ratio of the spokes to the window area is high. In terms of mechanical properties, the spokes may not be made too thin. Thus, the weight of the aluminum wheel is often much higher than the weight necessary to meet its mechanical strength, the lightweight effect of the wheel made of aluminum alloy is reduced to some extent, and the social requirements for low energy consumption and low emission may not be met.

As people's requirements for energy conservation, environmental protection, novelty and the like of automotive products increase, it is necessary to redesign the structure of the existing aluminum wheels to obtain lighter wheels.

SUMMARY OF THE INVENTION

Accordingly, the object of the present application is to provide a lighter wheel to meet the requirement for lightweight of wheels. Meanwhile, the wheel should be able to meet the engineer's requirement for appearance design of the wheel, enabling a larger ratio of the spokes to the window area.

In one aspect of the present application, provided is a composite wheel, including spokes, a rim and a central disc 3, one end of each spoke being connected to the central disc 3 and the other end of each spoke being connected to the rim, each spoke includes a spoke skeleton 1 and a spoke shell 2, and the spoke skeleton 1 is wrapped by the spoke shell 2; and the spoke shell 2 is made of plastic, rubber, nylon or resin.

In a preferred aspect of the present application, the spoke skeleton 1 has a T-shaped cross section or π-shaped cross section, i.e. the spoke skeleton 1 is a T-shaped spoke skeleton or a π-shaped spoke skeleton, T-shaped spoke skeleton top transverse edge 22 or π-shaped spoke skeleton top transverse edge 32 is disposed close to outer surface of a hub, and T-shaped spoke skeleton longitudinal edge 21 or π-shaped spoke skeleton longitudinal edge 31 is disposed to point to inner cavity of the hub.

In a preferred aspect of the present application, the T-shaped spoke skeleton top transverse edge 22 or the π-shaped spoke skeleton top transverse edge 32 has a thickness of 6-8 mm and the T-shaped spoke skeleton longitudinal edge 21 or the π-shaped spoke skeleton longitudinal edge 31 has a thickness of 3-5 mm.

In a preferred aspect of the present application, the spoke skeleton 1 is in one spoke, the T-shaped spoke skeleton top transverse edge 22 or the π-shaped spoke skeleton top transverse edge 32 has a width of 22-45 mm and the T-shaped spoke skeleton longitudinal edge 21 or the π-shaped spoke skeleton longitudinal edge 31 has a width of 25-40 mm.

In a preferred aspect of the present application, the spoke skeletons 1 are integrated with the central disc 3 and the rim.

In a preferred aspect of the present application, the spoke skeletons 1, the central disc 3 and the rim are made of A356.2 aluminum alloy.

The technical solution of the present application brings the beneficial technical effects of overcoming the contradiction between the pursuit of the artistic design effect of the wheel and the pursuit of the lightweight of the wheel and meeting the strength requirement of the wheel.

BRIEF DESCRIPTION OF DRAWINGS

The embodiments of the present application will be described in detail below in combination with the accompanying drawings, in which.

In which: 1—spoke skeleton, 2—spoke shell, 3—central disc, 21—T-shaped spoke skeleton longitudinal edge, 22—T-shaped spoke skeleton top transverse edge, 31—π-shaped spoke skeleton longitudinal edge, 32—π-shaped spoke skeleton top transverse edge.

DETAILED DESCRIPTION OF THE INVENTION

The details and working conditions of the specific device proposed by the present application will be described below in combination with the accompanying drawings.

Embodiment 1

Figure 1:
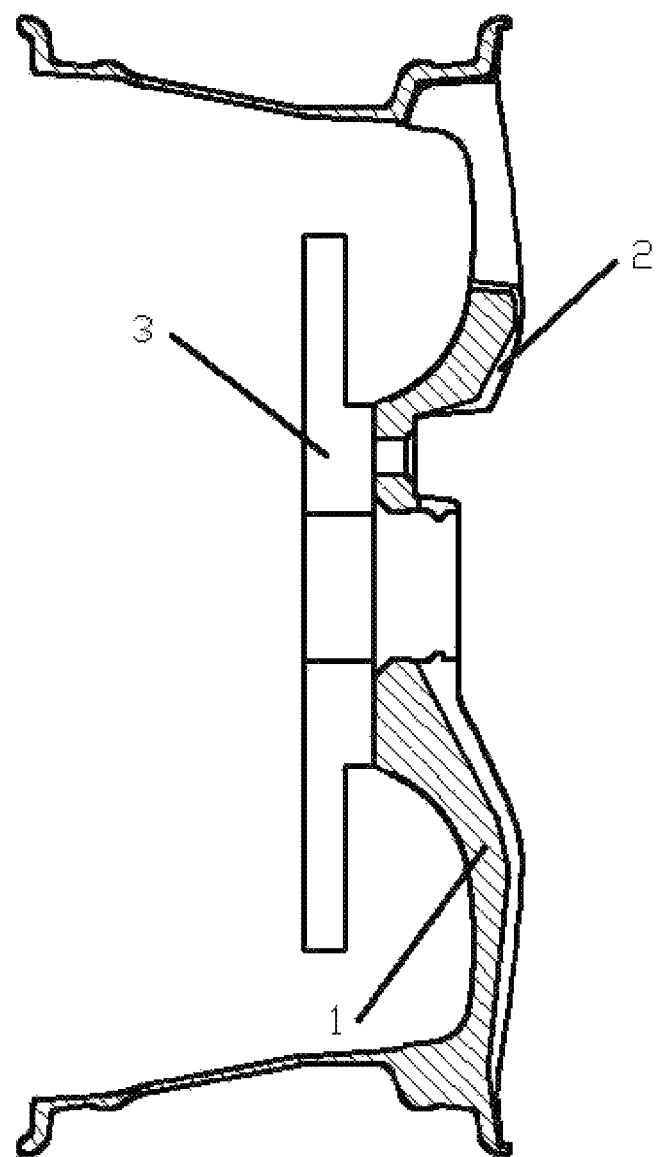
FIG. 1 is a structure diagram of a wheel according to embodiment 1 of the present application.
Figure 2:
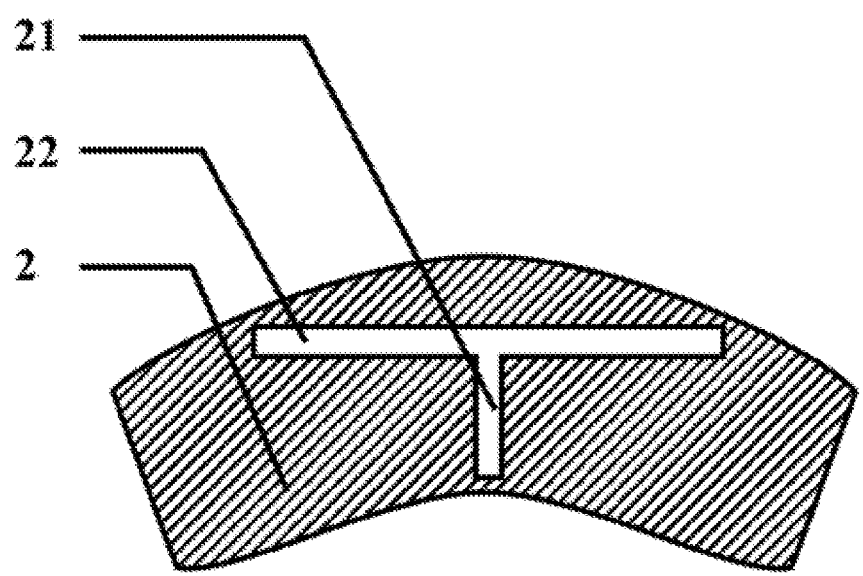
FIG. 2 is a schematic diagram of a cross section of a wheel spoke according to embodiment 1 of the present application.
Figure 3:
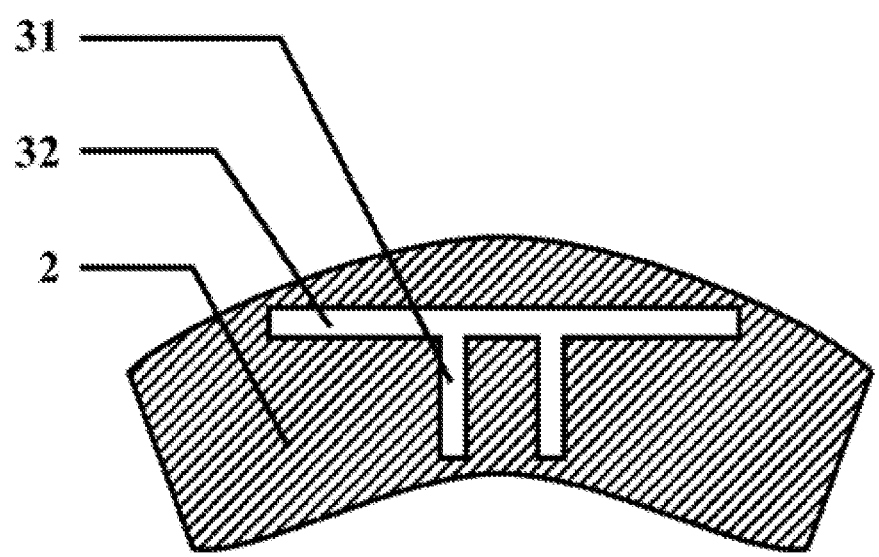
FIG. 3 is a schematic diagram of a cross section of another wheel spoke according to the present application.

This embodiment provides a composite wheel, including spokes, a rim and a central disc 3, one end of each spoke being connected to the central disc 3 and the other end of each spoke being connected to the rim, wherein each spoke includes a spoke skeleton 1 and a spoke shell 2, and the spoke skeleton 1 is wrapped by the spoke shell 2; and the spoke shell 2 is made of plastic. The spoke skeleton 1 has a T-shaped cross section, i.e. the spoke skeleton 1 is a T-shaped spoke skeleton, T-shaped spoke skeleton top transverse edge 22 is disposed close to outer surface of a hub, T-shaped spoke skeleton longitudinal edge 21 is disposed to point to inner cavity of the hub, and the T-shaped cross section of the spoke skeleton 1 is as shown in FIG. 2. The T-shaped spoke skeleton top transverse edge 22 has a thickness of 6 mm, the T-shaped spoke skeleton longitudinal edge 21 has a thickness of 5 mm, the T-shaped spoke skeleton top transverse edge 22 has a width of 22 mm, and the T-shaped spoke skeleton longitudinal edge 21 has a width of 40 mm. The spoke skeletons 1, the central disc 3 and the rim are made of A356.2 aluminum alloy and integrated.

Embodiment 2

This embodiment provides a composite wheel, including spokes, a rim and a central disc 3, one end of each spoke being connected to the central disc 3 and the other end of each spoke being connected to the rim, wherein each spoke includes a spoke skeleton 1 and a spoke shell 2, and the spoke skeleton 1 is wrapped by the spoke shell 2; and the spoke shell 2 is made of plastic. The spoke skeleton 1 has a T-shaped cross section, i.e. the spoke skeleton 1 is a T-shaped spoke skeleton, T-shaped spoke skeleton top transverse edge 22 is disposed close to outer surface of a hub, T-shaped spoke skeleton longitudinal edge 21 is disposed to point to inner cavity of the hub, and the T-shaped cross section of the spoke skeleton 1 is as shown in FIG. 2. The T-shaped spoke skeleton top transverse edge 22 has a thickness of 8 mm, the T-shaped spoke skeleton longitudinal edge 21 has a thickness of 3 mm, the T-shaped spoke skeleton top transverse edge 22 has a width of 45 mm, and the T-shaped spoke skeleton longitudinal edge 21 has a width of 25 mm. The spoke skeletons 1, the central disc 3 and the rim are made of A356.2 aluminum alloy and integrated.

Embodiment 3

This embodiment provides a composite wheel, including spokes, a rim and a central disc 3, one end of each spoke being connected to the central disc 3 and the other end of each spoke being connected to the rim, wherein each spoke includes a spoke skeleton 1 and a spoke shell, 2 and the spoke skeleton 1 is wrapped by the spoke shell 2; and the spoke shell 2 is made of plastic. The spoke skeleton 1 has a T-shaped cross section, i.e. the spoke skeleton 1 is a T-shaped spoke skeleton, T-shaped spoke skeleton top transverse edge 22 is disposed close to outer surface of a hub, T-shaped spoke skeleton longitudinal edge 21 is disposed to point to inner cavity of the hub, and the T-shaped cross section of the spoke skeleton 1 is as shown in FIG. 2. The T-shaped spoke skeleton top transverse edge 22 has a thickness of 7 mm, the T-shaped spoke skeleton longitudinal edge 21 has a thickness of 4 mm, the T-shaped spoke skeleton top transverse edge 22 has a width of 30 mm, and the T-shaped spoke skeleton longitudinal edge 21 has a width of 30 mm. The spoke skeletons 1, the central disc 3 and the rim are made of A356.2 aluminum alloy and integrated.

Comparative Example 1

The shape of the wheel of Embodiment 1 was modeled, and an all-aluminum alloy hub was cast in accordance with this shape.

Comparative Example 2

The shape of the wheel of Embodiment 1 was modeled, but each spoke was composed of an aluminum alloy layer and a non-metallic material layer. The thickness of the aluminum alloy layer was designed such that its overall weight was 15.50 kg and the overall shape was the same as that in Embodiment 1. At this time, the aluminum alloy portion in the spoke had a thickness of 9.4 mm and was located on the side of the wheel spoke facing inner cavity. The side of the wheel spoke facing outside was made of plastic.

Embodiment 4

60 wheels of Embodiments 1-3 and Comparative Examples 1-2 were weighed respectively, and the average weights thereof were shown in Table 1:

Table 1: Weights of wheels of Embodiments 1-3 and Comparative Example 1-2

| Group No. | Average weight/kg | Weight reduction ratio/% |
|---|---|---|
| Embodiment 1 | 15.01 | 16.15 |
| Embodiment 2 | 14.75 | 17.60 |
| Embodiment 3 | 15.23 | 14.92 |
| Comparative Example 1 | 17.90 | — |
| Comparative Example 2 | 15.50 | 13.41 |

It may be seen from the table 1 that the wheels of Embodiments 1-3 achieve a weight reduction effect of 14.92-17.60%. Meanwhile, the prepared wheels of Comparative Example 2 reduce the weight by 13.41%.

Embodiment 5

This test was carried out on a wheel 90-degree impact tester built by Dicastal. Main impact hammer was 910 kg, auxiliary balancer was 100 kg, and three springs with rigidity of 1.07 kN/mm were disposed between the main hammer and the auxiliary balancer. An initial deformation of 6 mm was added to coil springs during assembly. A tire was mounted on surface of a hub, and the hub was mounted on a 0-degree impact tester having an impact height of 127 mm. After the test, on the condition that the wheel had no cracks (inspected with a dye penetrant inspection agent), no obvious degeneration and no sharp air leakage, then the test is pass.

12 groups of wheels in Embodiments 1-3 of the present application and Comparative Examples 1-2 were tested in parallel. The wheels of Embodiments 1-3 and Comparative Example 1 all passed the test. Only 3 groups of wheels of Comparative Example 2 had no obvious cracks after the impact test (but had obvious cracks after inspection with a dye penetrant inspection agent).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A composite wheel, comprising spokes, a rim and a central disc, one end of each spoke being connected to the central disc and the other end of each spoke being connected to the rim, wherein each spoke comprises a spoke skeleton and a spoke shell, and the spoke skeleton is wrapped by the spoke shell; and the spoke shell is made of plastic, rubber, nylon or resin, the spoke skeleton has a T-shaped cross section or π-shaped cross section, top transverse edge of T-shaped spoke skeleton or π-shaped spoke skeleton is disposed closer to an outer surface of a hub than an inner cavity of the hub, and the longitudinal edge of T-shaped spoke skeleton or π-shaped spoke skeleton is disposed to point to the inner cavity of the hub.

2. The composite wheel according to claim 1, wherein the top transverse edge of T-shaped spoke skeleton or π-shaped spoke skeleton has a thickness of 6-8 mm and the longitudinal edge has a thickness of 3-5 mm.

3. The composite wheel according to claim 1, wherein the spoke skeleton is in one spoke, the top transverse edge of T-shaped spoke skeleton or π-shaped spoke skeleton has a width of 22-45 mm and the longitudinal edge has a width of 25-40 mm.

4. The composite wheel according to claim 1, wherein the spoke skeletons are integrated with the central disc and the rim.

5. The composite wheel according to claim 1, wherein the spoke skeletons, the central disc and the rim are made of A356.2 aluminum alloy.

* * * * *